United States Patent [19]

Hayashi et al.

[11] 4,177,174

[45] Dec. 4, 1979

[54] EPOXY RESIN COMPOSITION CURED BY REACTION PRODUCT OF PHENOL CARBOXYLIC ACIDS WITH POLYAMINO COMPOUNDS

[75] Inventors: Masaaki Hayashi, Kamakura; Kazuyoshi Tsuneta; Hiroshi Takada, both of Yokohama; Nobuhiro Kenmotsu; Hiroharu Sasaki, both of Kamakura, all of Japan

[73] Assignee: Dai Nippon Toryo Co., Ltd., Osaka, Japan

[21] Appl. No.: 795,125

[22] Filed: May 9, 1977

[30] Foreign Application Priority Data

May 14, 1976 [JP] Japan .................................. 51-55025
May 20, 1976 [JP] Japan .................................. 51-57275

[51] Int. Cl.$^2$ ............................................. C08G 59/44
[52] U.S. Cl. .......................... 260/18 PN; 260/29.1 R; 525/450; 528/100; 528/123
[58] Field of Search ........ 260/29.1 R, 47 EC, 47 EA, 260/47 EN, 2 EC, 2 EA, 2 N, 59 EP, 18 PN, 830 P, 834; 528/100, 123

[56] References Cited

U.S. PATENT DOCUMENTS

| | | | |
|---|---|---|---|
| 2,703,765 | 3/1955 | Osdal ..................................... | 117/75 |
| 3,390,124 | 6/1968 | Kittridge et al. ...................... | 260/47 |
| 3,409,591 | 11/1968 | Landua et al. ....................... | 260/47 |
| 3,595,833 | 7/1971 | Stolton ................................. | 260/47 |
| 3,639,928 | 2/1972 | Bentley et al. ................... | 260/47 EC |
| 3,740,373 | 6/1973 | Bentley et al. ................... | 260/47 EC |
| 3,753,917 | 8/1973 | Spoelder et al. .................... | 252/182 |

OTHER PUBLICATIONS

Komoto et al., "Epoxy Resin Compositions", Chemical Abstracts 84:45341n, (1976).
Lee & Neville, "Handbook of Epoxy Resins", McGraw-Hill, 1967, pp. 25-12 & 25-13.

*Primary Examiner*—Earl A. Nielsen
*Attorney, Agent, or Firm*—Bucknam and Archer

[57] ABSTRACT

An epoxy resin coating composition comprising (i) an epoxy resin containing in the molecule at least 2 epoxy groups and (ii) a reaction product formed by condensing an amino compound containing in the molecule at least 2 nitrogen atoms and active hydrogen atoms bonded thereto with 5 to 30% by weight, based on said amino compound, of at least one compound selected from the group consisting of phenol-carboxylic acids and esters thereof.

11 Claims, No Drawings

EPOXY RESIN COMPOSITION CURED BY REACTION PRODUCT OF PHENOL CARBOXYLIC ACIDS WITH POLYAMINO COMPOUNDS

BACKGROUND OF THE INVENTION

1. Field of the Invention

This invention relates to a solventless or high-solids epoxy resin coating composition mainly for use in forming anticorrosive coatings which comprises an epoxy resin containing in the molecule at least 2 epoxy groups and a curing agent composition.

2. Description of the Prior Art

Vehicles now used for paints include a variety of resins, for example, unsaturated fatty acids, alkyd resins, olefin type resins, diene type resins, acrylic resins, polyester resins, epoxy resins, urethane resins and copolymers of these resins. Among them, epoxy resins are excellent in physical properties (adhesion to substrates and hardness) and chemical properties (resistances to chemicals) and the demand for epoxy resins as vehicles for paints has been increasing.

Recently, it has become an important requirement that paints should not be dangerous or harmful. Namely, paints are required to have a much reduced inflammability and no toxicity to the human body.

As one paint meeting such requirements, there has been developed a so-called aqueous paint comprising an epoxy resin dispersed, emulsified or dissolved in water. Coating epoxy resin compositions of this type are disclosed in, for example, the specifications of U.S. Pat. No. 2,811,495, U.S. Pat. No. 2,899,397, U.S. Pat. No. 3,324,041, U.S. Pat. No. 3,355,409, U.S. Pat. No. 3,449,281 and U.S. Pat. No. 3,640,926.

A variety of other resin compositions have also been investigated and developed in the art as aqueous paints.

However, these known aqueous coating resin compositions are still inferior to solvent type coating compositions with respect to such properties as moisture resistance, corrosion resistance and physical properties.

Various attempts have heretofore been made to reduce or overcome these shortcomings. For example, addition of rust inhibiting pigments such as lead cyanamide, lead suboxide, basic lead chromate, red lead, strontium chromate and zinc chromate has been proposed, but use of these pigments is not desirable because these pigments readily cause environmental pollution.

Further, none of the known aqueous coating resin compositions are completely satisfactory in various physical properties represented by the adhesion under a high humidity condition.

Further, attempts have been made in the past to improve physical properties of coatings by incorporating into a paint a chelate-forming compound such as a polyhydric phenol, e.g., pyrogallol, a phenol carboxylic acid, a chromium-containing complex salt, a phthalocyanine, a pyridine, a derivative thereof or the like and causing a chelating reaction between the coating and the surface of an iron substrate.

As an old instance of a paint of this type, there is known a solvent type resin formed by merely incorporating tannin in a linseed oil type resin or a drying oil (see the specification of British Pat. No. 826,564 and No. 826,566).

Later, R. N. Faulkner et al. developed a one-pack type solvent paint formed by introducing catechol, pyrogallol, gallic acid or gallic acid ester in the form of a covalent bond into a vegetable oil, a fatty acid ester, an alkyd resin, a vegetable oil-modified epoxy ester resin or a vegetable oil-modified polyamide resin by utilizing a catalyst such as a metal alkoxide. Paints of this type are disclosed in, for example, the specification of British Pat. No. 1,045,118 and U.S. Pat. No. 3,304,276 and U.S. Pat. No. 3,321,320, and Journal of the Oil and Colour Chemists' Association, 50, 524 (1967) published by the Oil and Colour Chemists' Association. Further, the specification of British Pat. No. 1,114,400 discloses a composition formed by reacting a styreneallyl alcohol copolymer with a gallic acid ester.

Chelate-forming compositions including an epoxy resin are also known in the art. For example, there are known chelate-forming resins formed by modifying a part of epoxy groups with a monobasic fatty acid and reacting the remaining epoxy groups with a fatty acid derivative having a chelate-forming capacity and containing in the molecule at least two adjacent phenolic hydroxyl groups and one free carboxyl group (see Japanese Patent Publication No. 2439/73); compositions comprising a chelate-forming epoxy-polyamide resin formed by reacting residual epoxy groups of a reaction product formed between an epoxy resin and a polyamide resin having an amine value of up to 10, with gallic acid and incorporating therein, a phosphoric acid derivative (Japanese Patent Publication No. 17443/73); and a one-pack type or two-pack type (an amine type curing agent being used) paint comprising a partially esterified product obtained by reacting a part of epoxy groups of an epoxy resin with salicylic or gallic acid or its ester, an epoxy, vinyl or fluoroethylene resin and an organic solvent as a diluent for the foregoing resin components (Japanese Patent Publication No. 4811/74 and Japanese Patent Application Laid-Open Specification No. 56226/73, No. 56228/74, No. 122538/74 and No. 122597/74).

In each of the foregoing known paints, a large quantity of an organic solvent is used, and hence, they are still insufficient with respect to safety and prevention of environmental pollution. Further, when ingredients of these paints are examined, it is seen that in each of these known paints, the epoxy resin which is the main ingredient, is used in the modified state. In other words, each of these known compositions is a one- or two-pack paint formed by reacting all or a part of epoxy groups in the epoxy resin as the main ingredient with a chelate-forming compound, and therefore, excellent properties inherent in the epoxy resin are drastically lowered.

Further, there are known solventless or high-solids epoxy resin coating compositions developed as coating compositions causing no environmental pollution or as labor-saving coating compositions. In coating compositions of this type, in view of efficiency of the coating operation, only epoxy resins with low viscosity can be used, and therefore, these compositions provide only coatings having poor corrosion resistance.

Some of the inventors previously proposed a completely solvent-free aqueous resin composition comprising (i) an aqueous dispersion of a resin containing in the molecule at least 2 epoxy groups and (ii) a reaction product formed between an amino type curing agent containing in the molecule at least 2 nitrogen atoms and active hydrogen atoms bonded thereto and protocatechuic acid and/or gallic acid is disclosed.

As a result of subsequent research work, it was found that aqueous coating compositions of this type involve various problems. More specifically, uncured coatings just after application of these compositions are easily dissolved or flowed by the contact with water, and freezing or destruction of the emulsion in the composition takes place at low temperatures. Therefore, the compositions are poor in storage stability at low temperatures. Further, when coating is applied at low temperatures, the coating is almost never cured uniformly and properties of the cured coating are extremely poor.

SUMMARY OF THE INVENTION

This invention relates to a novel epoxy resin composition in which the foregoing defects and disadvantages involved in the conventional techniques can be overcome or moderated.

Objects of this invention are as follows:

(1) To provide a coating composition which can give a coated film excellent in chemical and physical properties such as humidity resistance, corrosion resistance and adhesion under a high humidity condition.

(2) To provide a coating composition which can give a coated film excellent in rust preventive property without incorporation of a particular rust-inhibiting pigment.

(3) To provide a solventless or high-solids coating composition which has high handling safety.

(4) To provide a coating composition which can be stored very stably even at low temperatures.

(5) To provide a coating composition which can be uniformly cured even at relatively low temperatures to form a uniform coating.

(6) To provide a coating composition in which dissolution or flow of the coating is not caused even if the coating is contacted with water just after application.

Other objects and advantages of the present invention, especially improvements in the chemical and physical properties of resulting coated films will be apparent from the following detailed description.

In accordance with this invention, there is provided a two-pack type epoxy resin composition comprising (1) an epoxy resin having in the molecule at least 2 epoxy groups and (2) a reaction product obtained by condensing an amino compound containing in the molecule at least 2 nitrogen atoms and active hydrogen atoms, bonded with 5 to 30% by weight, based on the amino compound, of at least one compound selected from the group consisting of phenolcarboxylic acids and esters thereof.

DETAILED DESCRIPTION OF THE PREFERRED EMBODIMENTS

The "epoxy resin having in the molecule at least 2 epoxy groups" used in this invention (hereinafter referred to as "an epoxy group-containing resin") includes an epoxy group-containing epoxy resin.

As the epoxy group-containing epoxy resin, the following can be mentioned:

(1) Glycidyl ether of bisphenol resins having an average molecular weight of about 300 to about 900 and an epoxy equivalent of about 150 to about 500, which are represented by the following general formula:

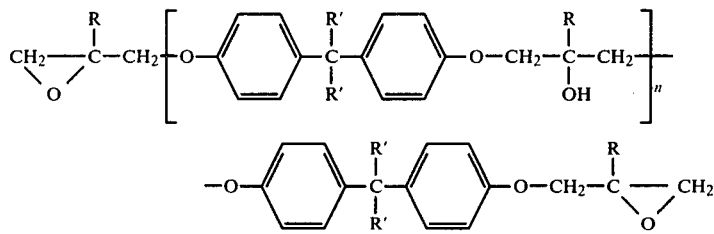

wherein n is an integer between 0 and 3 inclusive, R stands for H, CH$_3$ or CH$_2$Cl and R' stands for H or CH$_3$, and which are obtained by condensing bisphenol A or bisphenol F with epichlorohydrin, β-methyl epichlorohydrin or β-chloromethyl epichlorohydrin.

Epoxy group-containing epoxy resins of this type are commercially available, for example, as Epikote 808, Epikote 815, Epikote 819, Epikote 827, Epikote 828, Epikote 834 and Epikote 1001, each being a product manufactured by Shell Chemical Co.; Araldite GY-250, Araldite GY-252 and Araldite GY-260, each being a product manufactured by Ciba Geigy Corporation; DER 330, DER 331, DER 332 and EX-7818, each being a product manufactured by Dow Chemical Co.; and Epiclon 830, Epiclon 840 and Epiclon 850, each being a product manufactured by Dainippon Ink & Chemicals Inc.

Other glycidyl ethers of bisphenol epoxy resins are represented by the following general formula:

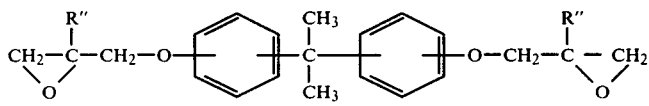

wherein R" stands for H or CH$_3$.

Epoxy resin of this type is commercially available, for example, as SB-300, being a product manufactured by Sakamoto Yakuhin Kogyo Co., Ltd.

Still another glycidyl ether of a bisphenol epoxy resin of this invention contains a hydrogenated epoxy resin obtained by condensing a hydrogenated bisphenol with epichlorohydrin.

An epoxy resin of this type having an average molecular weight of about 350 to 400 and an epoxy equivalent of about 230 to 270 is commercially available as, for example, Epilite 4000 manufactured by Kyoeisha Gushi Co., Ltd.

(2) Glycidyl ethers of phenolic novolak resins having an average molecular weight of about 300 to about 650 and an epoxy equivalent of about 170 to about 220, which are represented by the following general formula:

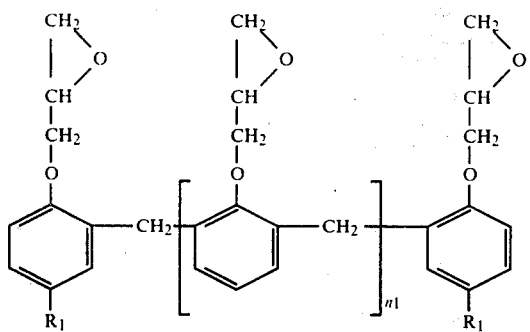

wherein $n_1$ is an integer between 0 and 2 inclusive and $R_1$ stands for H, $CH_3$, $C_2H_5$ or $C_3H_7$.

Epoxy group-containing epoxy resins of this type are commercially aviailable as, for example, DEN 431, DEN 438 and DEN 439 manufactured by Dow Chemical Co.

(3) Glycidyl ethers of polyglycol resins having an average molecular weight of about 150 to about 1000 and an epoxy equivalent of 110 to 400, which are represented by the following general formula:

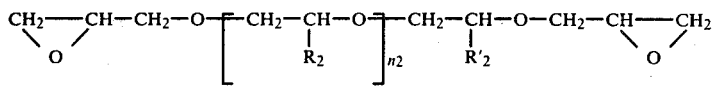

wherein $n_2$ is an integer between 0 and 13 inclusive and $R_2$ and $R'_2$ stand for H or $CH_3$.

Epoxy group-containing epoxy resins of this type are commercially available as, for example, DER 732, DER 736 and DER 741 manufactured by Dow Chemical Co. and Denacol EX-810, EX-840 and EX 910 manufactured by Nagase and Co., Ltd.

(4) Glycidyl esters of polycarboxylic acid resins having an epoxy equivalent of about 150 to about 220, which are represented by the following general formula:

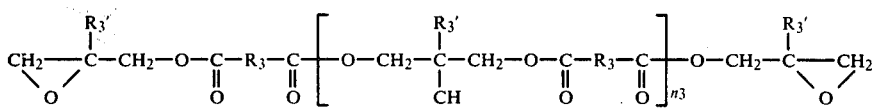

wherein $n_3$ is 0 or 1, $R_3$ stands for $-(-CH_2)_{\overline{m}}$ in which m is 0, 1 or 2 or

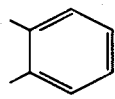

and $R_3'$ stands for H or $CH_3$.

Epoxy group-containing epoxy resins of this type are commercially available as, for example, Epiclon 200 and Epiclon 400 manufactured by Dainippon Ink & Chemical Inc. and Shodyne 500, 508 and 509 manufactured by Showa-Denko Co., Ltd.

(5) Epoxidized polybutadiene resins having an oxiran oxygen content of 7.5 to 8.5% and a molecular weight of about 500 to about 1300, which are represented by the following general formula:

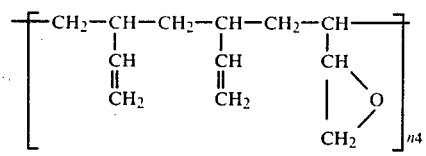

wherein $n_4$ is an integer between 3 and 8 inclusive.

Epoxy group-containing epoxy resins of this type are commercially available as, for example, BF-1000 manufactured by Nippon Soda Co.

(6) Epoxidized oils having an oxirane oxygen content of 6 to 9% and an average molecular weight of about 350 to about 1500, which are represented by the following general formula:

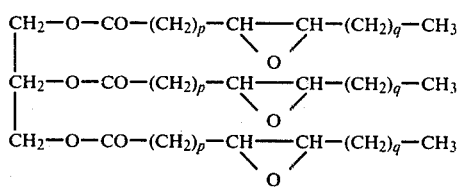

wherein p and q each are an integer between 1 and 10 inclusive.

Epoxy group-containing epoxy resins of this type are commercially available as, for example, ADK CIZER 0-180 and ADK CIZER 0-130P manufactured by Adeka Argus Chemical Co.

(7) Aniline modified epoxy resins having an average molecular weight of about 200 to 250 and an epoxy equivalent of about 125 to 145, which are represented by the following general formula:

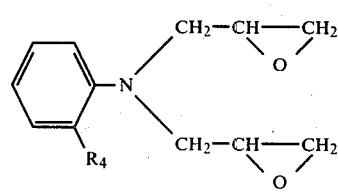

wherein $R_4$ stands for H or $CH_3$.

Epoxy group-containing resins of this type are commercially available as, for example, GAN and GOT manufactured by Nippon Kayaku Co., Ltd.

(8) Alicyclic epoxy resins such as those commercially available as Chissonox 206 (having an epoxy equivalent of 74 to 78) and Chissonox 221 (having an epoxy equivalent of 131 to 145) manufactured by Chisso Co.; glycidyl ethers of polyols, for example, glycidyl ethers of glycerine, trimethylolpropane or pentaerythritol, having an average molecular weight of about 200 to about 420 and an epoxy equivalent of about 130 to about 180, such as those commercially available as Denacol EX-314, EX-320, EX-411 and EX-611 manufactured by Nagase and Co., Ltd.

In this invention, among the foregoing epoxy group-containing epoxy resins, glycidyl ethers of bisphenol resins, glycidyl ethers of phenolic novolak resins and glycidyl ethers of polyglycol resins are preferably employed. Especially glycidyl ethers of bisphenol resins are most preferably employed.

It is preferred that epoxy group-containing epoxy resins such as mentioned above be liquid at room temperature. However, even epoxy resins having a melting point below 80° C., which are solid at room temperature, can be conveniently used in the present invention when they are mixed with liquid epoxy resins of diluents are incorporated therein.

If desired, in order to improve the workability of the application of the coating composition or the properties and appearance of the resulting coating, it is possible to use a mixture which is in an amount of 99.99–50% by weight of the epoxy group-containing resin and in an amount of 0.01–50% by weight of a monoepoxy compound having in the molecule one epoxy group. As such monoepoxy compound, there can be mentioned, for example, allyl glycidyl ether, 2-ethylhexyl glycidyl ether, methyl glycidyl ether, butyl glycidyl ether, phenyl glycidyl ether, styrene oxide, cyclohexene oxide, epichlorohydrin, epoxidized alkyl phenol and compounds having one epoxy group, which are obtained by modifying and epoxy resin having in the molecule at least 2 epoxy groups, such as mentioned above, with a fatty acid or the like.

The "amino compound having in the molecule at least 2 nitrogen atoms and active hydrogen atoms bonded thereto" that is used in the pesent invention includes amino compounds customarily used as curing agents for epoxy resins, such as amine adducts, resins and polyamideresins.

Polyamide resins that are used in the present invention are products obtained by condensing dimer acid (an ordinary industrial product includes about 3% of monomer acid, about 85% of dimer acid and about 12% of trimer acid) with a polyamine such as ethylene diamine, diethylene triamine or metaphenylene diamine. These polyamide resins are commercially available as, for example, Sunmides 335, 340 and 351 manufactured by Sanwa Chemical Ind. Co.; and Tohmide 245-HS manufactured by Fuji Chemical Industry Co.

Amine adduct resins that are used in the present invention are products obtained by the addition reaction between a propylene oxide, an ethylene oxide or the above-mentioned epoxy resin, such as a glycidyl ether of bisphenol epoxy resin, and an aliphatic or an aromatic polyamine such as ethylene diamine, diethylene triamine or metaphenylene diamine. These amine adduct resins are commercially available as, for example, Epotuf Hardeners 37-611 and Ruckamide B-203 manufactured by Dainippon Ink & Chemicals Inc.; React CA-101 manufactured by Sanyo-Kasei Chemical Co.; Torytex H-300 manufactured by Taiho Industry Co.; Epikures DX-103 and DX-124 manufactured by Shell Chemical Co.; and Sunmides X-11P and X-3000 manufactured by Sanwa Chemical Industry Co.

As another example of the amine adduct resin that can be used in this invention, there can be mentioned a product obtained by the addition reaction between butyl glycidyl ether, glycidyl ester of Versatic Acid or glycidyl ether of bisphenol epoxy resin and a heterocyclic diamine represented by the following formula:

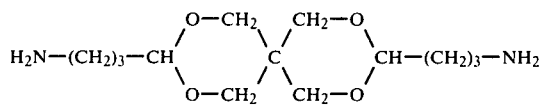

Amine adduct resins of this type are commercially available as, for example, Epomates B-002 and C-002 manufactured by Ajinomoto Co. As the polyamine that can be used in this invention, there can be mentioned, for example, diethylene triamine, triethylene tetramine, xylene diamine, isophorone diamine and phenol modified polyamines.

The phenol modified polyamines are commercially available as, for example, Sunmides X-963 and TX-983 manufactured by Sanwa Chemical Industry Co.

Other polyamines are commercially available as, for example, Araldites HY-837 and HY-943 manufactured by Ciba Geigy Corporation; Fujicures X-003, X-003D and 5000 manufactured by Fuji Chemical Industry Co.; and Epikure DX-121 manufactured by Shell Chemical Co.

The foregoing curing agents may be used singly or in the form of a mixture of two or more of them.

In order to cause the cross-linking reaction between the curing agent and the epoxy group-containing resin, it is indispensable that the curing agent should have in the molecule at least 2 nitrogen atoms and active hydrogen atoms bonded thereto.

The curing agent to be used in this invention need not satisfy other particular requirements. However, it is preferred that the amine value of the curing agent be higher than 100. However, use of a curing agent having too high an amine value results in the disadvantage that the pot life of the composition after the curing agent is incorporated in the epoxy resin as the main ingredient is shortened. Further, the viscosity of the curing agent should also be taken into account, because the properties of both the coating and the coated film are greatly influenced by the viscosity of the curing agent. In general, use of a curing agent having a high viscosity reduces the adaptability to the coating operation and shortens the pot life. These shortcomings, however, can be moderated by addition of a small amount of the above-mentioned monoepoxy compound.

By the term "reaction product" used in the present invention is meant a reaction product obtained by condensing an amino compound such as mentioned above with a phenol-carboxylic acid and/or an ester thereof. As the phenol-carboxylic acid, there can be mentioned, for example, protocatechuic acid and gallic acid. As the ester of these phenol-carboxylic acids, there can be mentioned esters of these phenol-carboxylic acids with alcohols having 1 to 12 carbon atoms. For example, there can be mentioned methyl gallate, ethyl gallate, propyl gallate, isoamyl gallate, lauryl gallate, ethyl protocatechuate and propyl protocatechuate.

The phenol-carboxylic acid and/or its ester is used in an amount of 5 to 30% by weight, preferably 10 to 25% by weight, based on the solid of the amino compound. When the amount of the phenol-carboxylic acid and/or its phenol is smaller than 5% by weight, the intended effect of the present invention cannot be substantially attained. If the amount of the phenol-carboxylic acid and/or its ester is larger than 30% by weight, the resulting coating is hard and brittle and the humidity resistance is degraded. Further, from the economical viewpoint, it is not preferred to use the phenol-carboxylic acid and/or its ester in such a large amount.

The reaction of the phenol-carboxylic acid and/or its ester with an amino compound such as mentioned above is conducted according to, for example, the following method.

A phenol-carboxylic acid such as mentioned above and/or its ester and an amino compound such as mentioned above are heated under agitation at an optional temperature in the range of 100° to 240° C. in the presence of an inert gas such as nitrogen or under a reduced pressure until a predetermined amount of water or an alcohol is formed by condensation.

By this condensation reaction, the phenol-carboxylic acid and/or its ester is introduced in the curing agent by covalent bonds.

In general, it is preferred that the above reaction product be used in the liquid state. Of course, a reaction product which is solid at room temperature may also be used when it is diluted with a diluent or a small amount of an organic solvent described hereinafter.

In the present invention, in order to enhance the corrosion resistance of the resulting film, it is possible to incorporate in the reaction product a suitable amount, for example, 2 to 30% by weight of tannic acid.

Various additives may be incorporated in the composition of this invention according to need. For example, there may be incorporated extender pigments such as talc, kaolin, barium sulfate and calcium carbonate, coloring pigments such as carbon black, chrome yellow, titanium oxide, zinc white, red iron oxide, black iron oxide, micaceous iron oxide, aluminum powder, ultramarine blue, and phthalocyanine blue; reinforcing pigments such as glass fiber, glass flake, mica powder, synthetic silica and asbestos; and thickeners, rust-inhibiting agents, pollution-free rust inhibiting pigments, defoaming agent, anti-sagging agents, suspending agents, swelling agents, curing promotors, diluents and a small amount of an organic solvent.

As the rust-inhibiting agent or pollution-free rust-inhibiting pigment, there can be mentioned, for example, sodium nitrite, phosphoric acid, ammonium phosphate, zinc phosphate, zinc molybdate, aluminium polyphosphate, and barium metaborate.

As the curing promotor, there can be mentioned, for example, phenol, cresol, nonylphenol, bisphenol A, salicylic acid, resorcine, hexamethylene tetramine, 2,4,6-tris(dimethylaminomethyl)phenol and triethylene diamine. When a tartiary amine is used, a low-temperature curing-promoting effect can be obtained.

As the diluent, there can be mentioned, for example, plasticizers such as dibutyl phthalate, dioctyl phthalate and the like; soybean oil; pine oil; and products commercially available as, for example, Epiclon WT-100 manufactured by Dainippon Ink & Chemicals Inc., EX-50 and EX-1500 manufactured by Kureha Chemical Co. and Nikanol LL manufactured by Mitsubishi Gas Chemical Co. As the organic solvent, there can be mentioned, for example, xylene, methyl ethyl ketone, methyl isobutyl ketone, n-butyl acetate, ethylene glycol monoethyl ether, ethylene glycol monobutyl ether, ethylene glycol monoethyl ether acetate, furfuryl alcohol and benzyl alcohol.

In this invention, the amount of such organic solvent should be up to 30% by weight based on the composition of this invention.

In this invention, it is possible to use, in combination with the epoxy group-containing resin, other resin in a minor amount, preferably up to 5% by weight based on the epoxy group-containing resin. These additive resins need not be reactive with the epoxy groups of the above-mentioned epoxy group-containing resin or the reaction product.

These additive resins are incorporated so as to improve the coating workability of the composition and the properties and surface appearance of the resulting coated film. As examples of the additive resin, there can be mentioned phenolic resins, hydrocarbon resins such as polybutadiene, alkyd resins, polyester resins, maleic oils, urethanated oils, coal tar and asphalt.

Further, other curing agents, for example, ketimine which is commercially available as Epikure H-3 manufactured by Shell Chemical Co. can be used with the above-mentioned reaction product of this invention.

It is preferred that the additives be incorporated in the epoxy group-containing epoxy resin used as the main ingredient of the composition of this invention. However, they can instead be incorporated in the reaction product used as the curing agent of the composition of this invention.

The intended objects of the present invention cannot be attained at all by the single use of the above-mentioned epoxy group-containing resin (the main ingredient) or the reaction product (the curing agent composition). In other words, the two components should be mixed prior to application. Then, the composition is applied to a substrate according to a conventional application method, for example, brush coating, air spray coating, airless spray coating, hot airless spray coating or roller coating method. Then, the so formed coating is dried at room temperature or under heating. The film thickness of the resulting coating is 50–400μ.

As the substrate, there can be mentioned, for example, degreased, conversion treated, rusted or wet steel plate; galvanized steel; tin plate; aluminium plate; copper plate; under-coated plate, for example, wash primer coated or zinc rich paint coated plate.

In the above-mentioned drying and film-forming steps, a cross-linking reaction is caused between the main ingredient and the curing agent composition. In order to perform this reaction effectively, the epoxy group-containing resin should be mixed with the curing agent composition at an appropriate mixing ratio. In general, it is preferred that both the components be mixed at such a ratio that the ratio of the epoxy groups in the main ingredient to the active hydrogen atoms bonded to the nitrogen atoms in the curing agent composition is within the range of from 1/2 to 2/1. However, a coating composition having the above ratio outside this range can also be used in this invention.

In the case where the monoepoxy compound is used, it is preferred that a mixture of the resin having in the molecule at least 2 epoxy groups and the monoepoxy compound having in the molecule 1 epoxy group be mixed with the curing composition so that the ratio of total epoxy groups/active hydrogen atoms is within a range of from 1/2 to 2/1.

In this invention, a top coating may further be formed on this coated film according to a conventional method for decoration or other purpose.

As the top coating, there can be mentioned, for example, a vinyl chloride resin coating, a chlorinated rubber coating, a urethane resin coating, a silicone resin coating, a acrylic resin coating, a vinyl fluoride resin coating, an alkyd resin coating or an epoxy resin coating.

A suitable kind of top coating paint is chosen with due consideration to the interlaminar adherence or bleeding.

The composition of the present invention can also be used as an adhesive or putty while characteristic properties of the composition of the present invention are effectively utilized.

According to the present invention, a coating film having excellent properties can be formed even if a rust-preventing pigment is not particularly used.

Accordingly, the composition of the present invention includes almost no dange of a fire, and the present invention provides a solventless or high-solids coating composition having high pollution-preventing and labor-saving effects and a coating film excellent in anticorrosive properties such as humidity resistance, salt spray resistance and salt water dipping resistance. Therefore, the present invention is of great industrial significance.

The present invention will now be described in detail by reference to the following Examples, in which all "parts" and "%" are by weight unless otherwise indicated.

EXAMPLE 1

To 450 parts of an aniline-modified epoxy resin (manufactured and sold under tradename "GOT" by Nippon Kayaku Co.; epoxy equivalent of 115 to 135) were added 200 parts of talc and 350 parts of barium sulfate, and the mixture was milled by a roller to form a main ingredient.

Separately, 1000 parts of a polyamide resin (manufactured and sold under tradename "Sunmide 335" by Sanwa Chemical Ind. Co.; having an amine value of 450±20) was reacted with 100 parts of gallic acid at a temperature of 140° to 150° C. in the presence of an inert gas until a predetermined amount of water was obtained by condensation, to form a curing agent composition.

The above main ingredient was mixed with the curing agent composition at a mixing weight ratio of 100/45 to form an epoxy resin composition of the present invention.

The composition was applied to a rusted steel plate (about 1.6 mm×50 mm×150 mm) polished by waterproof sand paper (#80) by means of an airless spray so that the film thickness was 200±15μ. The coating was dried in a thermostat chamber (maintained at a temperature of 20° C. and a relative humidity of 75%) for 7 days, and the resulting coating was subjected to property tests. Obtained results are shown in Table 1 together with results obtained in other Examples.

EXAMPLE 2

To 450 parts of a bisphenol F epoxy resin (manufactured and sold under tradename "XD-7818" by Dow Chemical Co.; epoxy equivalent of 165) were added 200 parts of talc and 350 parts of barium sulfate, and the mixture was milled by a roller to form a main ingredient.

Separately, 1000 parts of a polyamide resin (manufactured and sold under tradename "Fujicure 245-HS" by Fuji Chemical Ind. Co.; amine value of 400±20) was reacted with 150 parts of gallic acid in the same manner as described in Example 1 to form a curing agent composition.

The above main ingredient was mixed with the curing agent composition at a mixing weight ratio of 100/80 to form an epoxy resin composition of the present invention.

A coating formed from this composition in the same manner as described in Example 1 was subjected to property tests. Obtained results are shown in Table 1.

EXAMPLE 3

To 150 parts of a bisphenol A epoxy resin (manufactured and sold under tradename "Epikote 827" by Shell Chemical Co.; epoxy equivalent of 185) and 100 parts of glycidyl ether of polyol resin (manufactured and sold under tradename "Denacol EX-314" by Nagase Sangyl Co. Ltd.; epoxy equivalent of 145) was added 200 parts of phenyl glycidyl ether (having an epoxy equivalent of 150). The viscosity of the mixture was adjusted and 200 parts of talc, 100 parts of red iron oxide and 250 parts of barium sulfate were added to the mixture. The resulting mixture was milled by a roller to form a main ingredient.

Separately, in the same manner as described in Example 1, a curing agent composition was prepared from 1000 parts of an amine adduct resin (manufactured and sold under tradename "Epotuf Hardener 37-611" by Dainippon Ink & Chemicals Inc.; amine value of 340±10) and 200 parts of gallic acid.

The above main ingredient was mixed with the curing agent composition as a mixing weight ratio of 100/40 to form an epoxy resin composition of the present invention.

A coating prepared from this epoxy resin composition in the same manner as described in Example 1 was subjected to property tests to obtain the results shown in Table 1.

EXAMPLE 4

To a resinous composition comprising 180 parts of the same bisphenol F epoxy resin as used in Example 2, 20 parts of a polyglycol epoxy resin (manufactured and sold under tradename "DER 736" by Dow Chemical Co.; epoxy equivalent of 175 to 205) and 250 parts of an alicyclic epoxy resin (manufactured and sold under tradename "Chissonox 206"; epoxy equivalent of 74 to 78) were added 150 parts of talc, 200 parts of barium sulfate and 100 parts of red iron oxide, and the mixture was milled by a roller to form a main ingredient.

Separately, 50 parts of gallic acid and 100 parts of protecatechuic acid were added to 500 parts of an amine adduct resin (manufactured and sold under tradename "Sunmide X-3000" by Sanwa Chemical Ind. Co.; amine value of 500±30) and 500 parts of the same polyamide resin as used in Example 1, and a curing agent composition was prepared in the same manner as described in Example 1.

The main ingredient was mixed with the curing agent composition at a mixing weight ratio of 100/75 to form an epoxy resin composition of the present invention.

A coating prepared from this composition in the same manner as described in Example 1 was subjected to property tests to obtain the results shown in Table 1.

EXAMPLE 5

To 320 parts of the same bisphenol F epoxy resin as used in Example 2 and 300 parts of a novolak epoxy resin (manufactured and sold under tradename "DEN 431" by Dow Chemical Co.; epoxy equivalent of 172 and 179) was added 100 parts of an epoxy group-free diluent (manufactured and sold under tradename "Epiclon WT-100" by Dainippon Ink & Chemicals Inc.) to adjust the viscosity. Then, 180 parts of talc, 250 parts of barium sulfate, 100 parts of red iron oxide and 20 parts of zinc phosphate were added to the above resinous composition, and the mixture was milled by a roller to form a main ingredient.

Separately, 1000 parts of a phenol-modified polyamine (manufactured and sold under tradename "Sunmide X-963" by Sanwa Chemical Ind. Co.; amine value of 570±30) was reacted with 150 parts of n-propyl gallate in the presence of 2 parts of sodium ethylate under the same conditions as described in Example 1 to form a curing agent composition.

The main ingredient was mixed with the curing agent composition at a mixing weight ratio of 100/20 to form an epoxy resin composition of the present invention.

Coating was conducted by using the so prepared composition in the same manner as described in Example 1, and the resulting coating was subjected to property tests to obtain the results shown in Table 1.

COMPARATIVE EXAMPLE 1

The main ingredient prepared in Example 1 was employed.

As the curing agent, the same polyamide resin (Sunmide 335) as used in Example 1 was used as it was without reaction with gallic acid.

The main ingredient was mixed with the curing agent at a mixing weight ratio of 100/41.

The composition was applied to the rusted steel plate and dried in the same manner as described in Example 1 and the resulting coating was subjected to property tests to obtain the results shown in Table 1.

COMPARATIVE EXAMPLE 2

The main ingredient prepared in Example 2 was employed.

As the curing agent, the same polyamide resin (Fujicure 245-HS) as used in Example 2 was used as it was without reaction with gallic acid.

The main ingredient was mixed with the curing agent at a mixing weight ratio of 100/68.

The composition was applied and dried in the same manner as described in Example 1, and the resulting coating was subjected to property tests to obtain the results shown in Table 1.

COMPARATIVE EXAMPLE 3

The main ingredient prepared in Example 3 was employed.

As the curing agent, the same amine adduct resin (Epotuf Hardener 37-611) as used in Example 3 was used as it was without modification.

The main ingredient was mixed with the curing agent at a mixing weight ratio of 100/32.

The composition was applied and dried in the same manner as described in Example 1, and the resulting coating was subjected to property tests to obtain the results shown in Table 1.

COMPARATIVE EXAMPLE 4

The main ingredient prepared in Example 4 was employed.

As the curing agent, the same amin adduct resin (Sunmide X-3000) as used in Example 4 was used as it was without modification with gallic acid and protocatechuic acid. More specifically, 500 parts of this amine adduct resin was mixed with 500 parts of the same polyamide resin as used in Comparative Example 1, and the resulting mixture was used as the curing agent in this Comparative Example.

The main ingredient was mixed with the curing agent at a mixing weight ratio of 100/64. The composition was applied and dried in the same manner as described in Example 1 to form a coating. The coating was subjected to property tests to obtain the results shown in Table 1.

COMPARATIVE EXAMPLE 5

The main ingredient prepared in Example 5 was employed.

As the curing agent, the same phenol-modified polyamine (Sunmide X-963) as used in Example 5 was used as it was without modification with n-propyl gallate.

The main ingredient was mixed with the curing agent at a mixing weight ratio of 100/17.

A coating was prepared from the composition in the same manner as described in Example 1, and the coating was subjected to property tests to obtain the results shown in Table 1.

Table 1

| | Results of Property Tests | | | |
|---|---|---|---|---|
| | Salt Spray Test[1] | Humidity Resistance[2] | Salt Water Dipping Test[3] | Water Resistance[4] |
| Example 1 | not changed for 500 hours | not changed for 500 hours | not changed | not changed |
| Example 2 | " | " | " | " |
| Example 3 | " | " | " | " |
| Example 4 | " | " | " | " |
| Example 5 | not changed for 300 hours | not changed for 300 hours | " | " |
| Comparative Example 1 | blistered in 50 hours | blistered in 50 hours | entire surface blistered in 10 days | entire surface blistered in 10 days |
| Comparative Example 2 | " | " | " | " |
| Comparative Example 3 | " | " | " | " |
| Comparative Example 4 | " | " | " | " |
| Comparative | blistered in 30 | blistered in 30 | " | " |

Table 1-continued

| | Results of Property Tests | | | |
| --- | --- | --- | --- | --- |
| | Salt Spray Test[1] | Humidity Resistance[2] | Salt Water Dipping Test[3] | Water Resistance[4] |
| Example 5 | hours | hours | | |

Notes

[1] The test was conducted according to the salt spray test method of JIS Z-2371.

[2] The sample was allowed to stand still at a temperature of 50° C. and a relative humidity higher than 97%.

[3] The sample was cross-cut to the substrate and was dipped in 5% salt water at 20° C. for 30 days. Then, the cross-cut portion was subjected to the adhesive cellophane tape peeling test.

[4] The sample was allowed to stand still in water maintained at 20° C. for 60 days.

As will be apparent from the foregoing test results, coatings prepared from compositions of the present invention are excellent in salt spray resistance, humidity resistance, water resistance and salt water dipping resistance.

EXAMPLE 6

To 190 parts of a bisphenol A epoxy resin (manufactured and sold under tradename "SB-300" by Sakamoto Yakuhin Kogyo Co.; epoxy equivalent of 192) and 30 parts of a monoepoxidized alkyl phenol (manufactured and sold under tradename "SY-1001" by Sakamoto Yakuhin Kogyo Co.; epoxy equivalent of 250) were added 150 parts of talc, 350 parts of barium sulfate, 15 parts of xylene and 20 parts of benzyl alcohol, and the mixture was milled by a roller. Then, 245 parts of coal tar was added to and mixed with the milled mixture to form a main ingredient.

Seperately, 1000 parts of an amine adduct resin (manufactured and sold under tradename "Ruckamide B-203" by Dainippon Ink & Chemicals Inc.; amine value of 251) was reacted with 50 parts of gallic acid and 5 parts of xylene in the presence of an inert gas at 180° to 200° C. for about 3 hours until a predetermined amount of water was formed by condensation, to form a curing agent composition.

The above main ingredient was mixed with the curing agent composition at a mixing weight ratio of 100/15.7 to form an epoxy resin composition of the present invention.

The resulting composition was applied to a sand-blasted steel plate (about 1.6 mm × 50 mm × 150 mm) by means of an airless spray so that the film thickness was 300±20μ, and the resulting coating was dried for 7 days in a thermostat chamber (maintained at a temperature of 20° C. and a relative humidity of 75%) and subjected to property tests.

Test results are shown in Table 2 together with the results obtained in the subsequent Examples.

EXAMPLE 7

The same bisphenol A epoxy resin (230 parts) as used in Example 6 was mixed with 40 parts of phenyl glycidyl ether, 300 parts of talc, 300 parts of barium sulfate, 60 parts of red iron oxide and 70 parts of benzyl alcohol, and the mixture was milled for 2 days by a ball mill to form a main ingredient.

Separately, 850 parts of a modified polyamine (manufactured and sold under tradename "Sunmide TX-983" by Sanwa Chemical Ind. Co.; amine value of 594) and 150 parts of a polyamide resin (manufactured and sold under tradename "Sunmide 351" by Sanwa Chemical Ind. Co.; amine value of 145) were reacted with 300 parts of n-propyl gallate, 3 parts of sodium ethylate and 5 parts of xylene at a temperature of 180° to 200° C. for about 4 hours in the presence of an inert gas to form a curing agent composition.

The main ingredient was mixed with the curing agent composition at a mixing weight ratio of 100/16.4 to form an epoxy resin composition of the present invention.

The so formed composition was brushed on a sand-blasted steel plate (about 1.6 mm × 50 mm × 150 mm) so that the film thickness was 200±20μ. The coating was dried for 7 days in a thermostant chamber maintained at a temperature of 20° C. and a relative humidity of 75% and subjected to property tests to obtain results shown in Table 2.

EXAMPLE 8

The same bisphenol A epoxy resin (230 parts) as used in Example 6 was mixed with 390 parts of kaolin, 200 parts of barium sulfate, 60 parts of red iron oxide, 5 parts of carbon black, 20 parts of xylene, 35 parts of ethylene glycol monoethyl ether, 50 parts of methylisobutyl ketone and 10 parts of dimethyldioctadecyl ammonium bentonite, and the mixture was milled for 2 days by a ball mill to form a main ingredient.

Separately, 1000 parts of the same amine adduct resin as used in Example 6 was reacted with 150 parts of gallic acid and 200 parts of xylene in the presence of an inert gas at 140° to 170° C. for about 3 hours until a predetermined amount of water was formed by condensation, to form a curing agent composition.

The above main ingredient (100 parts) was mixed with 11.3 parts of the curing agent composition and 4.1 parts of an amine adduct resin (manufactured and sold under tradename "Sunmide X-11P" by Sanwa Chemical Ind. Co.; amine value of 400) to obtain an epoxy resin composition of the present invention.

The composition was applied to a sand-blasted steel plate (about 1.6 mm × 50 mm × 150 mm) by an airless spray so that the film thickness was 200±15μ, and the coating was dried for 7 days in a thermostat chamber maintained at a temperature of 20° C. and a relative humidity of 75% and subjected to property tests to obtain the results shown in Table 2.

EXAMPLE 9

The same bisphenol A epoxy resin (200 parts) as used in Example 6 was mixed with 30 parts of a bisphenol A epoxy resin (manufactured and sold under tradename "Epikote 834" by Shell Chemical Co.; epoxy equivalent of 230 to 270), 40 parts of the same nono-epoxidized alkyl phenol as used in Example 6, 260 parts of talc, 250 parts of barium sulfate, 70 parts of chrome yellow, 40 parts of pine oil, 70 parts of benzyl alcohol and 40 parts of methylisobutyl ketone, and the mixture was milled for 2 days in a ball mill to form a main ingredient.

The main ingredient was mixed with the same curing agent composition as used in Example 1 at a mixing weight ratio of 100/9.2 to form a epoxy resin composition of the present invention.

The so formed composition was brushed on a sandblasted steel plate (about 1.6 mm×50 mm×150 mm) so that the film thickness was 300±20μ, and the coating was dried for 7 days in a thermostat chamber maintained at a temperature of 20° C. and a relative humidity of 75% and subjected to property tests to obtain the results shown in Table 2.

EXAMPLE 10

A bisphenol A epoxy resin (245 parts) (manufactured and sold under tradename "Epikote 828" by Shell Chemical Co.; epoxy equivalent of 190) was mixed with 75 parts of butyl glycidyl ether, 400 parts of kaolin, 170 parts of barium sulfate, 80 parts of titanium oxide and 30 parts of benzyl alcohol and the mixture was milled in a ball mill for 2 days to obtain a main ingredient.

Separately, 1000 parts of the same polyamide resin as used in Example 1 was reacted with 100 parts of butyl protocatechuate and 3 parts of sodium ethylate at 150° to 160° C. for 3 hours under a reduced pressure while butyl alcohol formed by the reaction was removed by distillation.

Then, 100 parts of the main ingredient was mixed with 7.5 parts of the so obtained reaction product and 19.5 parts of the same curing agent composition as used in Example 6 to form an epoxy resin composition of the present invention.

The so prepared composition was applied to a sandblasted steel plate (about 1.6 mm×50 mm×150 mm) by an airless spray so that the film thickness was 300±20μ, and the coating was dried for 7 days in a thermostat chamber maintained at a temperature of 20° C. and a relative humidity of 75% and subjected to property tests to obtain the results shown in Table 2.

EXAMPLE 11

The same bisphenol A epoxy resin (103 parts) as used in Example 10 was mixed with 81 parts of an aniline-modified epoxy resin (manufactured and sold under tradename "GAN" by Nippon Kayaku Co.; epoxy equivalent of 125 to 145), 51 parts of phenyl glycidyl ether, 300 parts of talc, 300 parts of barium sulfate, 58 parts of red iron oxide, 18 parts of xylene, 29 parts of ethylene glycol monoethyl ether, 50 parts of furfuryl alcohol and 10 parts of dimethyldioctadecyl ammonium bentonite, and the mixture was milled for 2 days to form a main ingredient.

Then, 100 parts of the so prepared main ingredient was mixed with 18.8 parts of the same curing agent composition as prepared in Example 8 to form an epoxy resin composition of the present invention. The composition was diluted with a 1/1 mixture of ethylene glycol monoethyl ether and xylene so that the viscosity was adjusted to 20 poises as measured at 20° C. by a BH type viscometer. The diluted composition was applied to a polished steel plate by an airless spray so that the film thickness was 300±20μ, and the coating was dried for 7 days in a thermostat chamber maintained at a temperature of 20° C. and a relative humidity of 75% and subjected to property tests to obtain the results shown in Table 2.

EXAMPLE 12

A polyester epoxy resin (175 parts) (manufactured and sold under tradename "Shodyne 508" by Showa Denko Co.; epoxy equivalent of 190 to 200) was mixed with 175 parts of phenyl glycidyl ether, 200 parts of talc, 250 parts of barium sulfate, 100 parts of red iron oxide, 80 parts of benzyl alcohol and 20 parts of ethylene glycol monoethyl ether and the mixture was milled in a ball mill for 2 days to form a main ingredient.

Separately, 1000 parts of the same phenol modified polyamine as used in Example 5 was reacted with 200 parts of gallic acid and 5 parts of xylene at 170° to 180° C. in the presence of an inert gas for about 4 hours until a predetermined amount of water was formed by condensation.

Then, 100 parts of the above main ingredient was mixed with 7.3 parts of the so obtained reaction product and 8.9 parts of an amine adduct resin (Ruckamide B-203) to form an epoxy resin composition of the present invention.

The so prepared composition was applied to a sandblasted steel plate (about 1.6 mm×50 mm×150 mm) by means of a brush so that the film thickness was 200±15μ, and the coating was dried for 7 days in a thermostat chamber maintained at a temperature of 20° C. and a relative humidity of 75% and subjected to property tests to obtain the results shown in Table 2.

EXAMPLE 13

A hydrogenated bisphenol A epoxy resin (70 parts) (manufactured and sold under tradename "Epolite 4000" by Kyoeisha Yushi Co.; epoxy equivalent of 250±20) was mixed with 280 parts of the same aniline-modified epoxy resin as used in Example 11, 200 parts of talc, 250 parts of barium sulfate, 100 parts of red iron oxide, 20 parts of xylene and 80 parts of benzyl alcohol, and the mixture was milled by a roller to form a main ingredient.

Separately, 1000 parts of the same phenol-modified polyamine as used in Example 5 was reacted with 150 parts of gallic acid and 5 parts of xylene in the presence of an inert gas at a temperature of 170° to 180° C. for about 4 hours until a predetermined amount of water was formed by condensation, to form a curing agent composition.

The above main ingredient was mixed with the curing agent composition at a mixing weight ratio of 100/16.5 to form an epoxy resin composition of the present invention.

The so formed composition was brushed on a sandblasted steel plate (about 1.6 mm×50 mm×150 mm) so that the film thickness was 300±20μ, and the coating was dried for 10 days at a temperature of 5° C. and a relative humidity of 75% and subjected to property tests to obtain the results shown in Table 2.

EXAMPLE 14

A novolak epoxy resin (155 parts) (DEN-431) was mixed with 20 parts of a bisphenol A epoxy resin (manufactured and sold under tradename "Epikote 1001" by Shell Chemical Co.; epoxy equivalent of 450 to 500), 175 parts of phenyl glycidyl ether, 200 parts of talc, 250 parts of barium sulfate, 100 parts of red iron oxide, 50 parts of xylene and 50 parts of ethylene glycol monoethyl ether, and the mixture was milled by a roller to form a main ingredient.

Separately, 1000 parts of the same polyamide resin as used in Example 2 was reacted with 150 parts of protocatechuic acid and 50 parts of xylene in the presence of an inert gas at a temperature of 140 to 160° C. until a predetermined amount of water was formed by condensation, to form a curing agent composition.

The above main ingredient was mixed with the curing agent composition at a mixing weight ratio of 100/14.5 to form an epoxy resin composition of the present invention.

The so formed composition was applied to a sandblasted steel plate (about 1.6 mm×50 mm×150 mm) by means of a brush so that the film thickness was 200±15μ, and the coating was dried for 7 days in a thermostat chamber maintained at a temperature of 20° C. and a relative humidity of 75% and subjected to property tests to obtain the results shown in Table 2.

COMPARATIVE EXAMPLE 6

The main ingredient prepared in Example 6 was employed.

As the curing agent, an amine adduct resin (Buckamide B-203) was used as it was without reaction with gallic acid.

The main ingredient was mixed with the curing agent at a mixing weight ratio of 100/15, and the resulting composition was applied and dried in the same manner as described in Example 6. The resulting coating was subjected to property tests to obtain the results shown in Table 2.

COMPARATIVE EXAMPLE 7

The main ingredient prepared in Example 7 was employed.

The main ingredient (100 parts) was mixed with a curing agent composition comprising 4.2 parts of a modified polyamine resin (Sunmide TX-983) and 11.0 parts of a polyamide resin (Sunmide X-351) to form a comparative composition. The composition was applied and dried in the same manner as described in Example 7. The resulting coating was subjected to property tests to obtain the results shown in Table 2.

COMPARATIVE EXAMPLE 8

The main ingredient prepared in Example 8 was employed.

The main ingredient (100 parts) was mixed with a curing agent comprising 9.7 parts of an amine adduct resin (Ruckamide B-203) and 4.1 parts of an amine adduct resin (Sunmide X-11P) to form a comparative composition.

The composition was coated and dried in the same manner as described in Example 8, and the coating was subjected to property tests to obtain the results shown in Table 2.

COMPARATIVE EXAMPLE 9

The main ingredient prepared in Example 9 was employed.

As the curing agent, a polyamide resin (Sunmide 335) was used as it was without reaction with gallic acid.

The main ingredient was mixed with the curing agent at a mixing weight ratio of 100/8.3 to form a comparative composition. The composition was applied and dried in the same manner as described in Example 9. The resulting coating was subjected to property tests to obtain the results shown in Table 2.

COMPARATIVE EXAMPLE 10

The main ingredient prepared in Example 10 was employed.

The main ingredient (100 parts) was mixed with a curing agent composition comprising 10.3 parts of a polyamide resin (Sunmide 335) and 12.3 parts of an amine adduct resin (Ruckamide B-203) to form a comparative composition.

The composition was applied and dried in the same manner as described in Example 10, and the coating was subjected to property tests to obtain the results shown in Table 2.

COMPARATIVE EXAMPLE 11

The main ingredient prepared in Example 11 was employed.

As the curing agent, an amine adduct resin (Ruckamide B-203) was used as it was without reaction with gallic acid.

The main ingredient was mixed with the curing agent at a mixing weight ratio of 100/20.

The resulting comparative composition was applied and dried in the same manner as described in Example 11, and the resulting coating was subjected to property tests to obtain the results shown in Table 2.

Table 2

| | Results of Property Tests | | | | |
|---|---|---|---|---|---|
| | Water Resistance[1] | Salt Water[2] Dipping Test | Humidity[3] Resistance | Salt[4] Spray Test | Accelerated[5] Salt Water Dipping Test |
| Example 6 | not changed for 10 months | not changed for 3 months | not changed for 1000 hours | not changed for 1000 hours | not changed for 7 days |
| Example 7 | " | not changed for 10 months | " | " | " |
| Example 8 | not changed for 3 months | not changed for 3 months | not changed for 400 hours | not changed for 400 hours | " |
| Example 9 | not changed for 10 months | not changed for 10 months | " | " | blistered in 5 days |
| Example 10 | not changed for 3 months | not changed for 3 months | " | " | not changed for 7 days |
| Example 11 | not changed for 10 months | not changed for 10 months | not changed for 1000 hours | not changed for 1000 hours | " |
| Example 12 | not changed for 60 days | not changed for 30 days | not changed for 500 hours | not changed for 500 hours | " |
| Example 13 | not changed for 3 months | not changed for 3 months | " | not changed for 1000 hours | slightly blistered in 4 days |
| Example 14 | not changed for 3 months | not changed for 3 months | not changed for 1000 hours | not changed for 500 hours | slightly blistered in 4 days |
| Comparative Example 6 | blistered in 8 months | blistered in 30 days | " | rusted and blistered in 800 hours | blistered and peeled in 4 days |
| Comparative Example 7 | " | blistered in 8 months | chalked in 500 hours | blistered in 500 hours | blistered in 5 days |

Table 2-continued

| | Results of Property Tests | | | | |
|---|---|---|---|---|---|
| | Water Resis-[1] tance | Salt Water[2] Dipping Test | Humidity[3] Resistance | Salt[4] Spray Test | Accelerated[5] Salt Water Dipping Test |
| Comparative Example 8 | blistered in 60 days | blistered in 60 days | not changed for 400 hours | rusted and blistered in 200 hours | not changed for 7 days |
| Comparative Example 9 | blistered in 8 months | blistered in 8 months | " | " | blistered and peeled in 2 days |
| Comparative Example 10 | blistered in 60 days | blistered in 60 days | blistered in 400 hours | not changed for 400 hours | blistered in 4 days |
| Comparative Example 11 | blistered in 8 months | blistered in 8 months | " | blistered and peeled in 500 hours | blistered and peeled in 4 days |

Notes
The test methods 1) and 4) were the same as described in Table 1.
The test 5) was conducted by dipping a sample in a solution of 50 g of sodium chloride, 10 ml of acetic acid and 5 g of 30% aqueous hydrogen peroxide in 1000 ml of water, which was maintained at 60° C.

What is claimed is:

1. An epoxy resin coating compositions comprising (1) an epoxy resin containing in the molecule at least 2 epoxy groups and (2) a curing agent composition formed by condensing an amino compound containing in the molecule at least two nitrogen atoms and active hydrogen atoms bonded thereto with 5 to 30% by weight, based on the amino compound, of at least one member selected from the group consisting of protocatechuic acid and gallic acid and esters thereof, said esters being formed with alcohols containing 1-12 carbon atoms, said amino compound being at least one member selected from the group consisting of amine adduct resins and polyamide resins.

2. An epoxy resin composition as set forth in claim 1 wherein the epoxy resin has a melting point not higher than 80° C.

3. An epoxy resin composition as set forth in claim 1 wherein the epoxy resin is liquid at room temperature.

4. An epoxy resin composition as set forth in claim 1 wherein the epoxy resin is at least one member selected from the group consisting of glycidyl ethers of bisphenol resins and glycidyl ethers of phenolic novolak resins.

5. An epoxy resin composition as set forth in claim 1 wherein the amino compound has an amine value of at least 100.

6. An epoxy resin composition as set forth in claim 1 wherein the epoxy resin containing in the molecule at least 2 epoxy groups is mixed with the curing agent composition so that the ratio of epoxy groups/active hydrogen atoms is within a range of from 1/2 to 2/1.

7. An epoxy resin composition as set forth in claim 1 wherein a monoepoxy compound containing in the molecule one epoxy group is further incorporated in the epoxy resin containing in the molecule at least 2 epoxy groups.

8. An epoxy resin composition as set forth in claim 7 wherein the mixing weight ratio of the epoxy resin containing in the molecule at least 2 epoxy groups in the monoepoxy compound containing in the molecule one epoxy group is within a range of from 99.99/0.01 to 50/50.

9. An epoxy resin composition as set forth in claim 7 wherein a mixture of the epoxy resin containing in the molecule at least 2 epoxy groups and the monoepoxy compound containing in the molecule one epoxy group is mixed with the curing agent composition so that the ratio of total epoxy groups/active hydrogen atoms is within a range of from 1/2 to 2/1.

10. An epoxy resin composition as set forth in claim 1 wherein an organic solvent is further incorporated in an amount of up to 30% by weight based on the composition.

11. The epoxy resin coating composition according to claim 1 which is provided as a two-pack type, one first pack comprising said epoxy resin and the second pack comprising said curing agent composition.

* * * * *